United States Patent [19]

Nakashima et al.

[11] Patent Number: 5,177,625
[45] Date of Patent: Jan. 5, 1993

[54] IMAGE PROCESSING SYSTEM SUITABLE FOR USE FOR A FACSIMILE

[75] Inventors: Keisuke Nakashima; Tatsuki Inuzuka, both of Hitachi; Saburo Yasukawa, Katsuta; Yasuyuki Kozima, Hitachi; Yasuro Hori, Katsuta, all of Japan

[73] Assignee: Hitachi, Ltd., Tokyo, Japan

[21] Appl. No.: 660,876

[22] Filed: Feb. 26, 1991

[30] Foreign Application Priority Data

Feb. 27, 1990 [JP] Japan .................. 2-044603

[51] Int. Cl.⁵ .............................. H04N 1/32
[52] U.S. Cl. .................................. 358/468
[58] Field of Search ...................... 358/467–468, 358/448, 434–439

[56] References Cited

U.S. PATENT DOCUMENTS 4,903,146 2/1990 Nakahara .................. 358/468

Primary Examiner—Stephen Brinich
Attorney, Agent, or Firm—Antonelli, Terry, Stout & Kraus

[57] ABSTRACT

An image processing system which can learn user's preference to satisfy him to the full, and also comprises means for inquiring a user about his satisfaction degree to enhance it. The image processing system comprises means for learning user's preference such as his manner of setting and pressing a button, a destination, a condition set for copying, and means for changing a control parameter on the basis of the learning result.

19 Claims, 13 Drawing Sheets

TIME

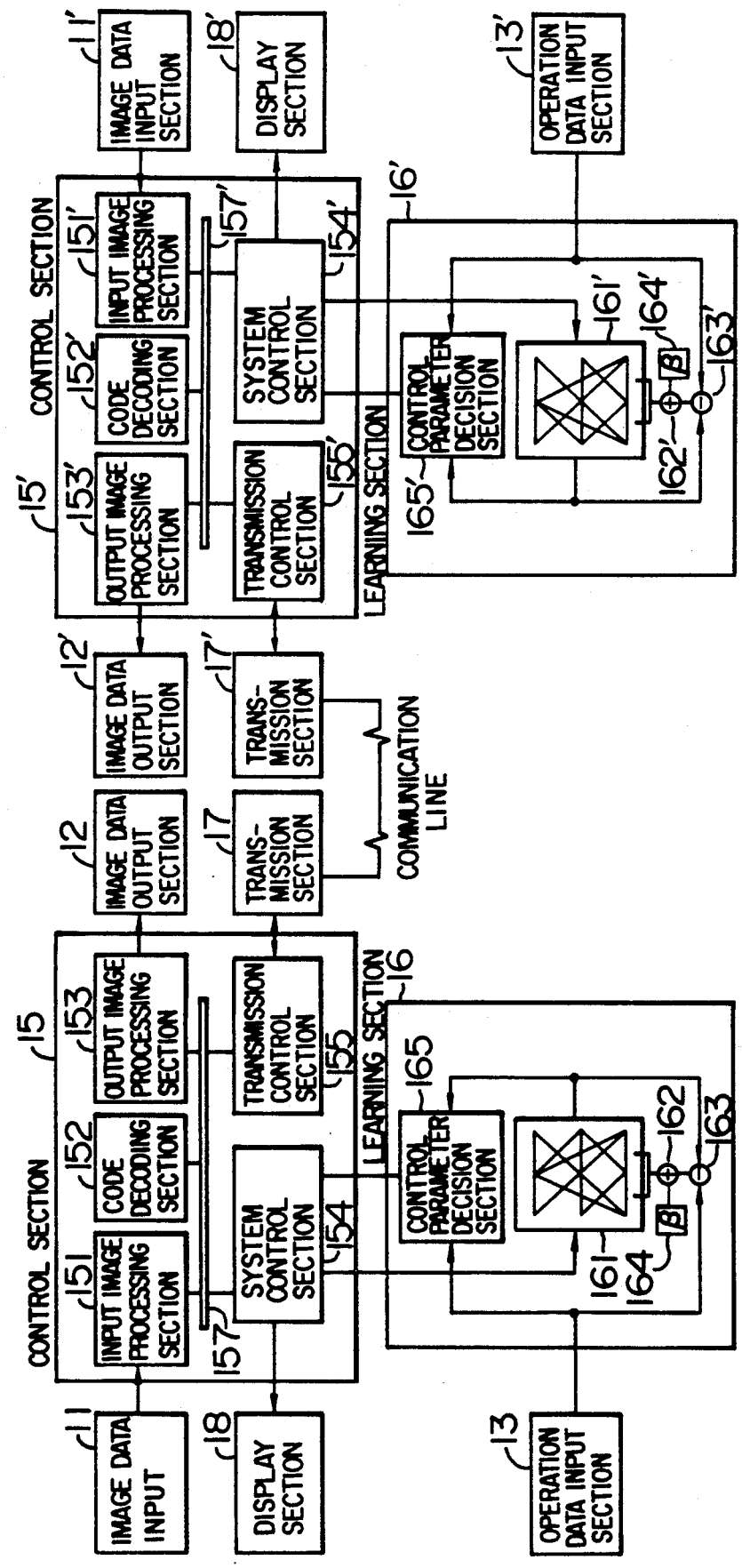
F I G. 15

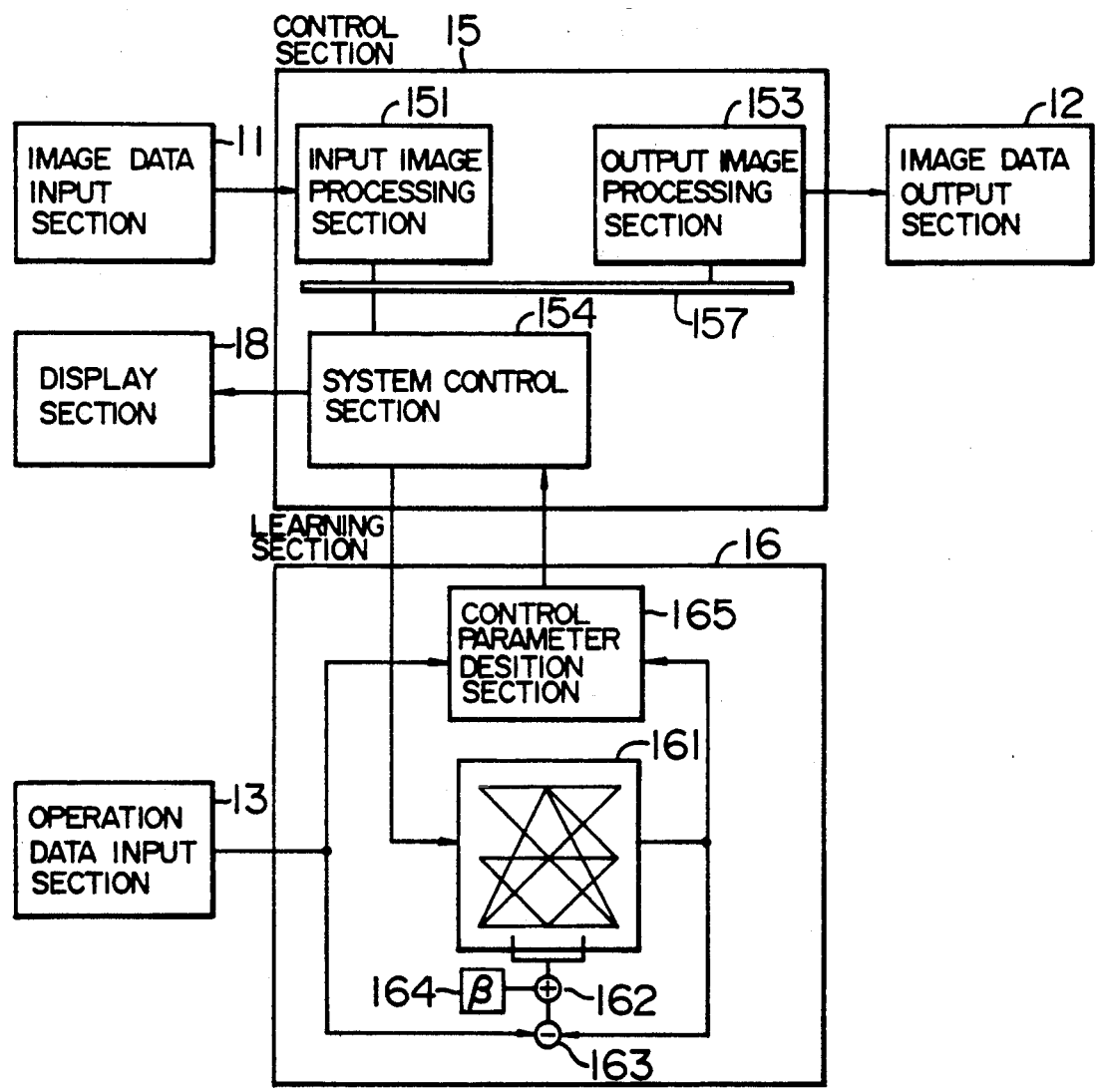
F I G. 20

IMAGE PROCESSING SYSTEM SUITABLE FOR USE FOR A FACSIMILE

BACKGROUND OF THE INVENTION

The present invention relates to a facsimile device which can improve its image quality, operability and transmission speed, and more particularly to an image processing system suitably used for a facsimile which can learn preference of a user to satisfy him to the full.

Prior arts relative to the image processing system for a facsimile device include taking the histogram of an image to decide a threshold value (JP-A-1-92881), hardware of designating the specific portion of an image (JP-A-1-27319), and deciding the density pattern of an image and a condition to decide a halftone area, thereby improving image quality (JP-A-1-26990).

Further, other prior arts are as follows: a device having a learning function to receive the function information of a destination facsimile in transmission and store it (JP-A-63-54865); a device having means for learning a transmission mode and changing it (JP-A-63-232676); and a method for preventing overflow of storage in the middle of a page in storing the image data to be transmitted in the memory of a facsimile device in a manner of estimating the amount of codes on a next page on the basis of the amount per page.

The prior art listed above has a problem that no concern is given to what degree an operator or user of the fascimile device is satisfied or user's preference is realized so that good balance cannot be taken among image quality, operability and transmission speed.

SUMMARY OF THE INVENTION

An object of the present invention is to provide an image processing system for use in a facsimile device which can learn user's preference to satisfy him to the full, and also provide an image processing system provided with means for inquiring a use about his satisfaction degree to enhance it.

In accordance with the present invention, the above object can be attained by means for learning user's preference such as his manner or setting and pressing a button, a destination, a condition set for copying and means for changing a control parameter on the basis of the learning result, or otherwise analog input means such as a volume or a digital input means of five or plural steps to learn user's fuzzier preference.

Further, the above object of the present invention can be attained by transmission control means of causing a transmission side device to learn the satisfaction degree of a receiver, and also by means for discriminating cards, fingerprints to discriminate operators.

For example, in the case where a user want to speedily repeat pressing a transmission button, the means for learning user's preference previously learns that this means that the user want to sent image information to a receiver for a very short time. When the button is actually pressed in such a manner, the learning means detects it. Then, the control means directed by the learning means will transmit at a high speed the image information with its linear density for transmission relatively reduced.

In the case where a user copies the same manuscript with the density parameter varying in operating an image processing system provided with a book read section, the learning means learns the density parameter finally set. On the basis of this learning result, the density parameter will be automatically renewed. Thereafter, in copying the same kind of manuscript, it will be copied with the above density parameter learned.

Further, several manuscripts such as a manuscript including only letters, a manuscript including only a photograph, a manuscript including both letters and photograph, a whitish manuscript, a blackish manuscript, etc. are automatically discriminated. This discriminating result will be shown to a user to accept his confirmation. The learning means will learn the discrimination of the manuscripts. The learning result can be reflected on controlling the image processing to enhance the degree of user's satisfaction.

BRIEF DESCRIPTION OF THE DRAWINGS

FIG. 15 is a block diagram of the communication system provided with the embodiment of the present invention on both transmission side and receiving side;

FIG. 20 is a block diagram of the image processing system according to another embodiment of the present invention.

DESCRIPTION OF THE PREFERRED EMBODIMENTS

Figure 1:
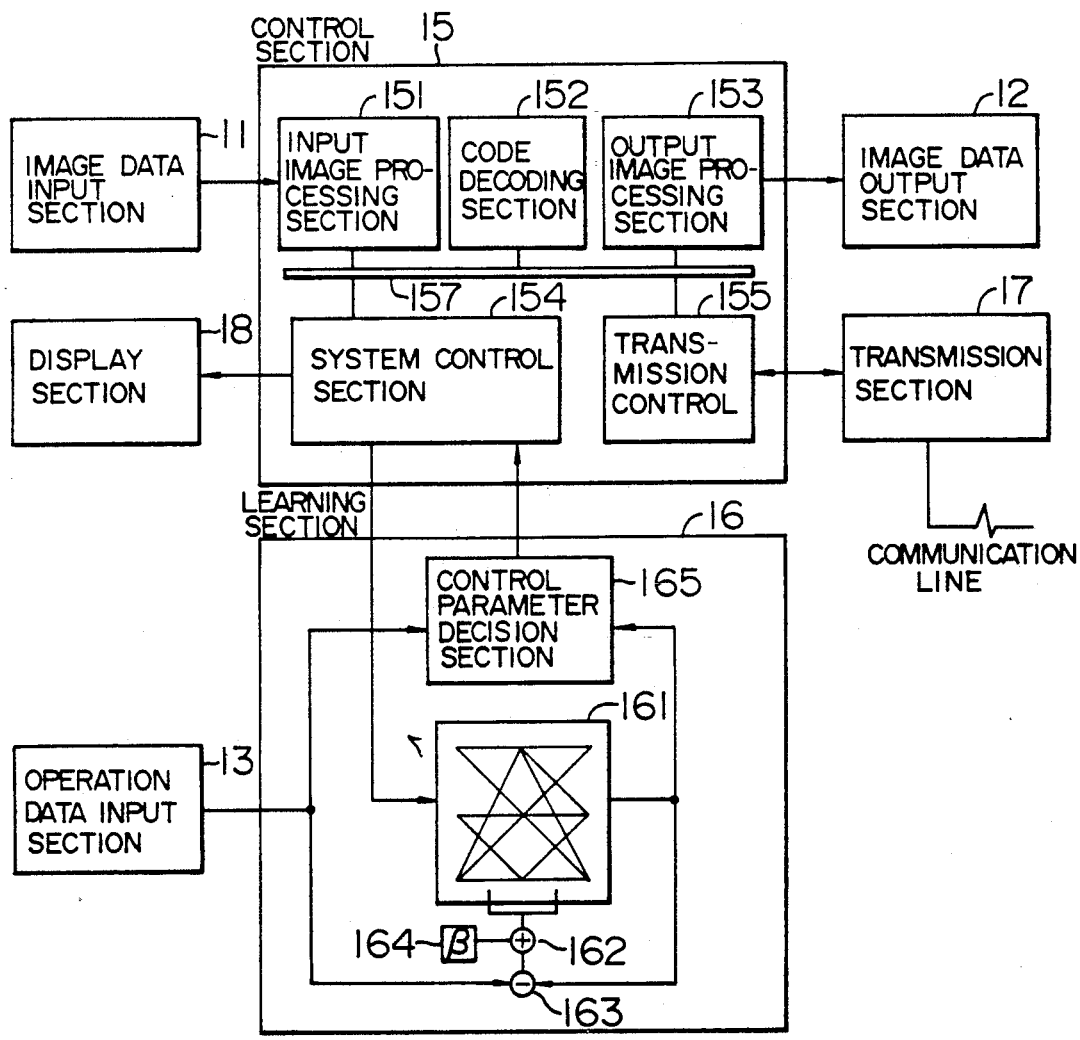
FIG. 1 is a block diagram of an image processing system according to one embodiment of the present invention.

Now referring to the drawings, explanation will be given of embodiments of the image processing system according to the present invention.

FIG. 1 shows an embodiment of the image processing system according to the present invention applied to a facsimile device. The image processing device according to this embodiment is composed of an image data input section 11, an image data output section 12, an operation data input section 13, a control section 15, a learning section 16, a transmission section 17 and a display section 18. The control section 15 is composed of an input image processing section 151, a code decoding section 152, an output image processing unit 153, a system control section 154, a transmission control section 155 and a bus 157.

In accordance with the embodiment of the present invention thus constructed, in facsimile transmission, an image to be transmitted is read by the image data input section 11 to be converted into digital image data. The digital image data are sent to the control section 15. They are subjected to an image-quality processing by the input image processing section 151 and encoded by the code encoding section 152. The encoded image data are modulated by the transmission control section 155 and sent out to a communication line through the transmission section 17.

The above described series of operations are performed in such a manner that the system control section 154 receives, through the learning section 16, an order or direction input by a user from the operation data input section 13 and analyzes this order to control the input image processing section 151, the code decoding section 152 and the transmission control section 155. The system control section 154 also sends the operation data to the display section 18 to display the internal state of each section which is shown for the user.

In response to this display, the user can modify the order or add a new order.

In the above transmission operation, the user sees the manuscript to be transmitted to decide the manner of the image-quality processing, transmission system etc (control parameters), and sets them at the operation data input section 13. The learning section 16 learns the correlations between these parameters input by the user and the parameters extracted from the input image data by control parameter decision section 165 and stores them in a neutral network 161 located in its inside.

A subtractor 163 within the learning section 16 compares the parameter newly input from the operation data input section 13 with the learning result hitherto made, i.e. the learning result stored in the neural network 161. As a result, if there is a difference therebetween, the correlation will be digitized. An adder 162 adds a learning coefficient $\beta$ to the correlation thus digitized. The resultant value is stored in the neural network 161. Then, the neural network 161 will change the internal value (learning result). Thus, the learning section 16 will can learn the control parameter.

The learning result (i.e. the parameter newly learned) is supplied to the system control section 154 through a control parameter deciding section 165 in the learning section 16, and used as a parameter in transmitting the image data as described above.

In facsimile reception, the image data transmitted through a communication line are received by the transmission section 17 and demodulated by the transmission control section 156. Thereafter, the demodulated image data are decoded by the code decoding section 152. The image data thus decoded are image-quality processed by the output image processing section 155, and the resultant image data are printed out on a piece of paper or the like by the image data processing section 12.

Figure 2A:
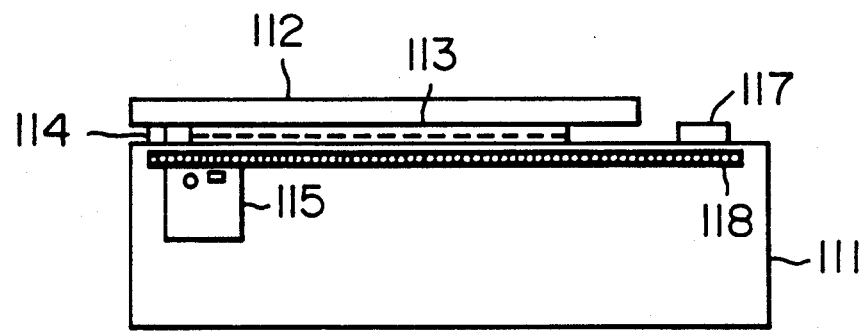
FIGS. 2A and 2B are sectional views of the image data input section in FIG. 1.
Figure 2B:
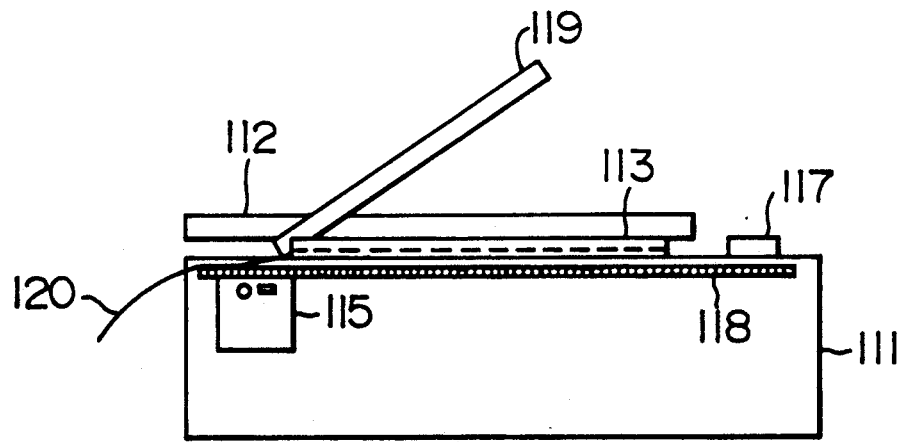

FIGS. 2A and 2B show illustrative arrangements of the image data input section 11.

In FIG. 2A, a manuscript 113 is placed with its main surface down on a glass 118 of an apparatus body 111. The manuscript 113 is covered with a cover 112 the opening/closing of which is detected by a detecting switch 114. When a starting switch 117 is pressed, a read section 115 moves to read the image on the manuscript.

The image data input section shown in FIG. 2B is adapted to be used also in a sheet traveling manner. In FIG. 2A, the cover 112 is provided with a sheet scanner guide 119 which can be used in place of it. A sheet manuscript 120 is moved to a read section 115 from the sheet scanner guide 119. Then, the image on the sheet manuscript 120 is read by the sheet read section 115.

Figure 3:
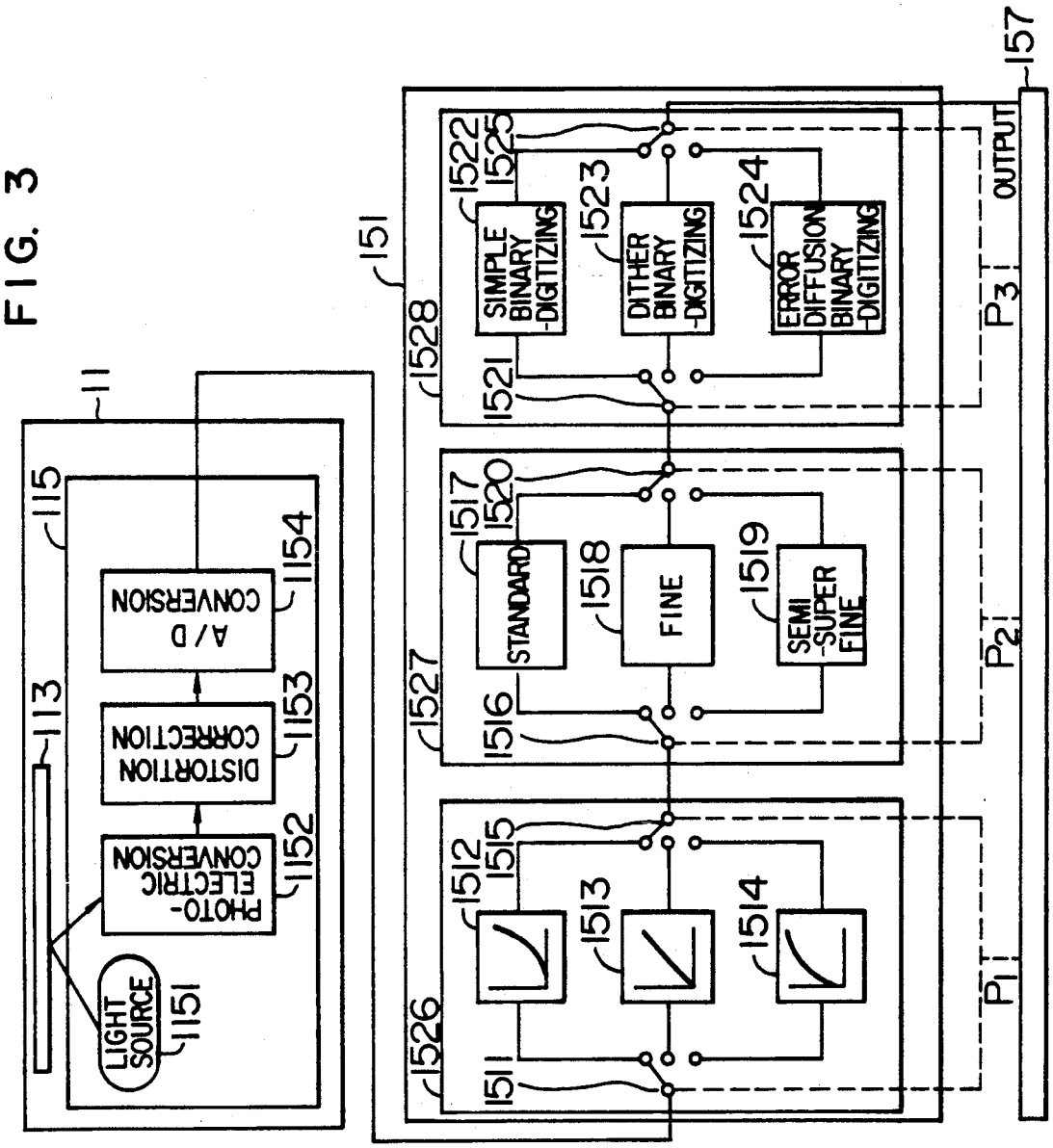
FIG. 3 is a function block diagram of the image data input section and the input image processing section in FIG. 1.

FIG. 3 shows a detailed arrangement of the read section 115 in FIG. 2 and the input image processing section 151 in FIG. 1.

In FIG. 3, a manuscript 113 is illuminated by a light source 1151 so that the image data on the manuscript are read by a photo-electric converter 1152 such as a CCD sensor and a contact sensor to be converted into an electric signal. The image data converted into an electric signal are supplied to a distortion correction section 1153 to correct the distortion of the image due to nonuniformity of illumination. The image data are converted into a digital signal by an A/D converter 1154. The digital signal is supplied to the input image processing section 151.

The input image processing section 151 is composed of a $\gamma$ correction section 1526 for enabling a plurality of parameters to be selected, a linear density designating section 1527 and a binary-digitizing section 1528.

The $\gamma$ correction section 1526 density-converts the input image data by a parameter function (one of functions 1512, 1513 and 1514 previously prepared is selected by a switch 1511). The density-converted image data are applied to the linear density designating section 1527.

The linear density designating section 1527 designates the linear density (i.e. scanning line density) of the image data by three parameters of a standard density (every other line) 1517, a fine density (each line) 1518 and a semisuper fine density (overlapping read at a half line pitch) 1519, one of which is selected in accordance with the user's preference. The image data with its linear density designated are supplied to the binary-digitizing section 1528.

The binary-digitizing section 1528 binary-digitizes the image data by three parameters of simple binary-digitizing 1522, dither binary-digitizing 1523 and error-diffusion binary-digitizing 1524, one of which can be selected in accordance with the user's preference.

The parameters mentioned above can be selected by changing the switches 1511, 1515, 1516, 1520, 1521 and 1525 in accordance with selection signals P1 to P3 supplied from the system control section 154 through the bus 157. By changing the combination of the above parameters, the user can obtain the image with the highest degree of satisfaction.

Figure 4:
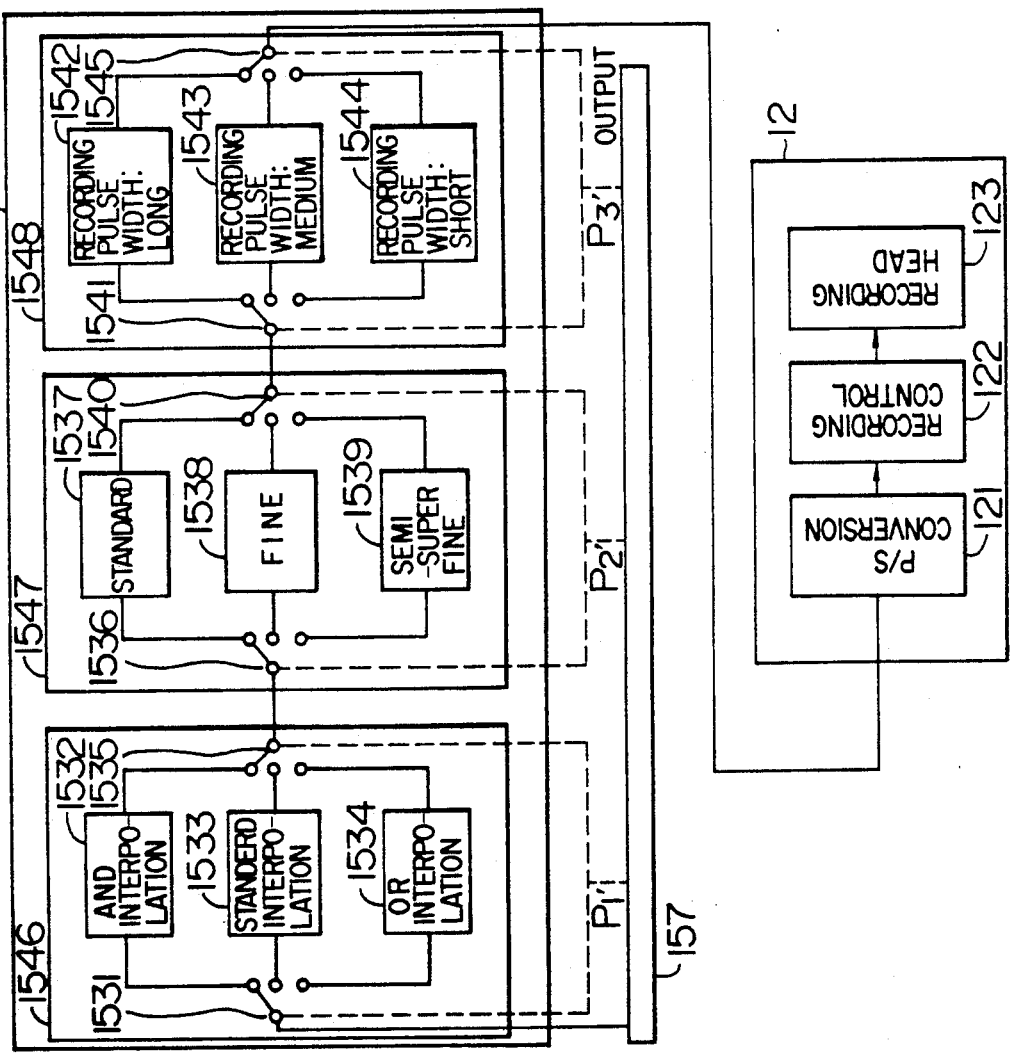
FIG. 4 is a functional block diagram of the output image processing section and the image data output section in FIG. 1.

FIG. 4 shows a detailed arrangement of the output image processing section 153 and the image data output section 12.

As seen from FIG. 4, the output image processing section 153 is composed of an interpolation section 1546, a linear density designating section 1547 and a recording pulse control section 1548. The interpolation section 1546 interpolates the input image data, e.g. the transmitted image data by three parameters of AND interpolation (whitish interpolation) 1532, standard interpolation 1533 and OR interpolation (blackish interpolation) 1534, one of which is selected by changing switches 1531 and 1535. The interpolation by the interpolation section 1546 is done to supplement insufficient data if the linear density of the transmitted input image is different from a recording linear density.

The linear density designating section 1547 designates the linear density with which the interpolated image data are to be recorded. If a high linear density is designated, the image is missing at the corresponding low rate and thus can be recorded with high definition; but it takes a long time. Incidentally, the internal arrangement of the linear density designating section 1547 is substantially the same as that of the linear density designating 1527 explained in connection with FIG. 3.

The recording pulse control section 1548 serves to control the width of pulses to be supplied to a recording head for recording image data, thereby varying the image tone; it can select one of three parameters of a long, a medium and a short pulse width. In this case, selecting the long pulse width provides a dark and clear image. However, this requires a large amount of electric power to be applied to the recording head, and also is likely to shorten the head life to deteriorate the recording head and lead a power source to a high temperature. On the other hand, selecting the short pulse width provides the opposite thing. Thus, selecting the recording pulse width depends on the kind of the image to be recorded.

The above parameters in the output image processing section 153 can be selected by changing the switches 1531, 1535, 1536, 1540, 1541 and 1545 in accordance with selection signals P1' to P3' supplied from the system control section 154 through the bus 157.

The image data subjected to the processing by the output image processing section 153 are supplied to the image data output section 12. In the image data output section 12, the data arrangement is parallel-series converted by a P/S conversion section 121 and the pulse width of the recording pulses is controlled. Thus, image data are recorded using a recording head 123.

Figure 5:
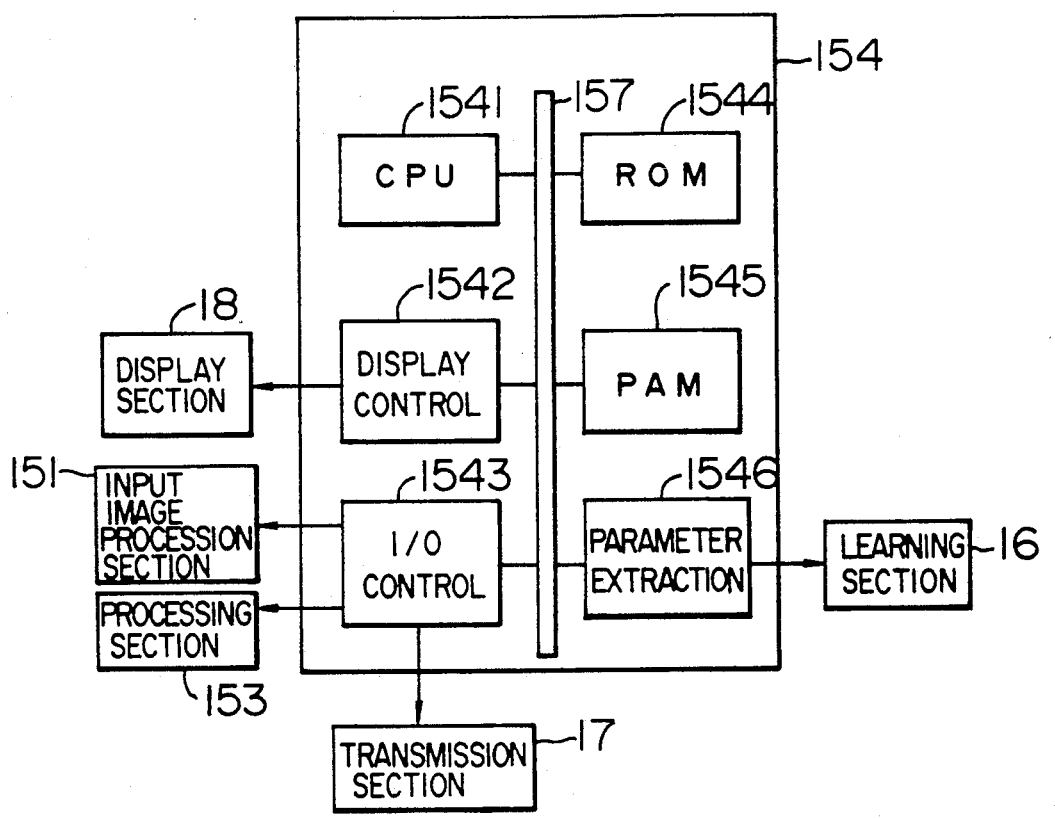
FIG. 5 is a functional block diagram of the system control section in FIG. 1.

FIG. 5 shows a detailed arrangement of the system control section 154. The system control section 154 shown in FIG. 5 comprises a CPU 1541, a ROM 1544 and a RAM 1545 as in an ordinary microcomputer system.

A display control section 1542 informs a user of the states of the respective components and executes the display procedure for guidance of operations to be carried out to display necessary information on the display section 18.

An I/O control section 1543 serves to control the entire processing within the system, e.g. the processings in the input image processing section 151 and the output image processing section 153 in accordance with the direction from the CPU 1541. The entire processing within the system includes a preprocessing for learning such as pattern extraction and pattern matching. The preprocessed image data are supplied to a parameter extraction section 1546 which converts the supplied data into more general data which will be learned by the leaning section 16.

Figure 6:
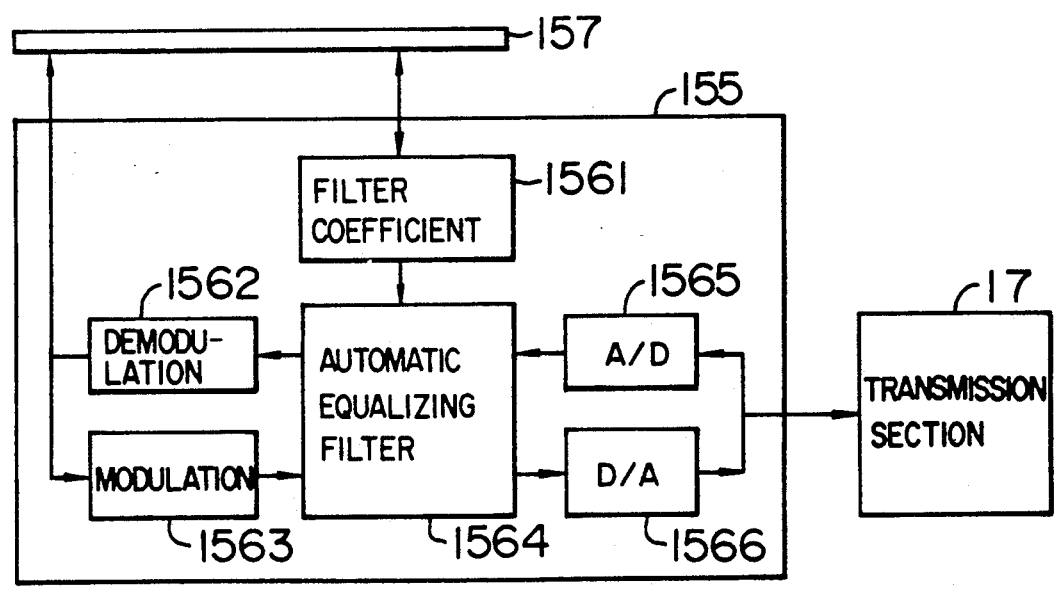
FIG. 6 is a functional block diagram of the transmission control section in FIG. 1.

FIG. 6 shows a detailed arrangement of the transmission control section 155.

In FIG. 6, the image data to be transmitted are supplied from the input image processing section 151 to the transmission control section through the bus 157.

The image data to be transmitted are modulated by a modulator 1563, and the modulated data are supplied to an D/A converter 1566 through an automatic equalizing filter 1564 so that the data are converted into analog data which will be sent out to a communication line through the transmission section 17. On the other hand, the data received by the transmission section 17 through the communication line, which are analog data, are supplied to an A/D converter 1565 so that the data are converted into digital data. The digital data are supplied to a demodulator 1562 through the automatic equalizing filter 1564 so that the digital data are demodulated. The demodulated data are supplied to e.g. the output image processing section 153 so as to be output as an image from the image data output section 12.

The above automatic equalizing filter 1564 serves to realize the filtering characteristic according to the property of a communication line to prevent an error in the image data from occurring on the way of their transmission. To this end, the automatic equalizing filter 1564 is provided with means for automatically changing its filter coefficient 1561 in accordance with the property of the communication line. However, it takes a long time to provide an accurate filter coefficient since the training therefor is time-consuming. This increases the time required for communication.

In order to reduce the communication time, in accordance with the present invention, the filter coefficient is previously learned for each communication destination. By using this learning result, the image data can be transmitted at a high speed.

Figure 7:
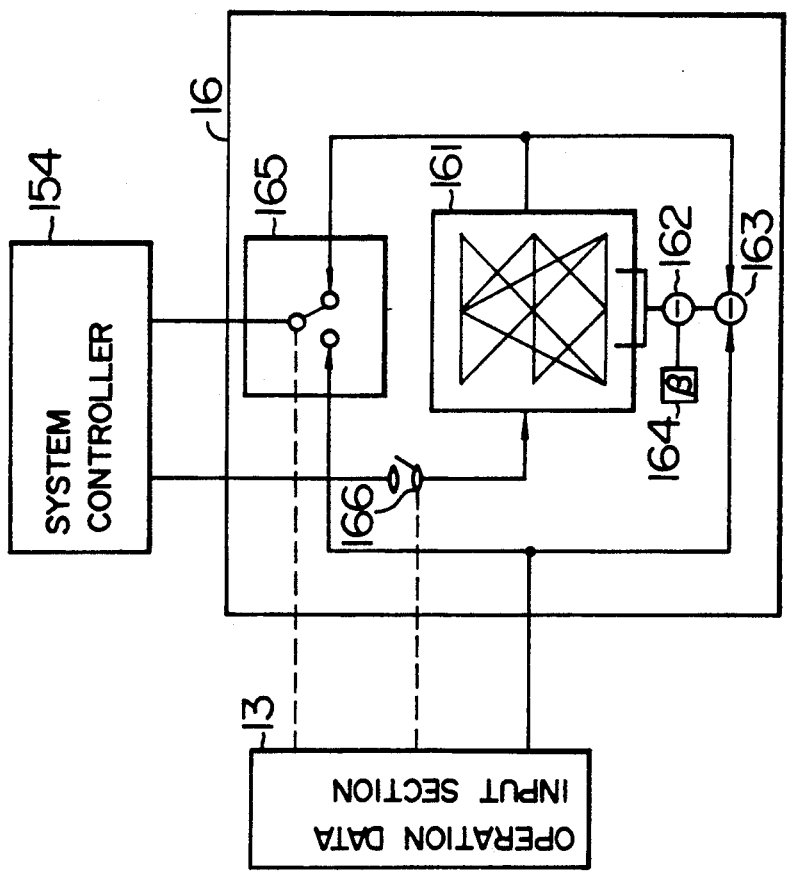
FIG. 7 is a functional block diagram of the learning section.

FIG. 7 shows a detailed arrangement of the learning section 16.

The learning section 16 is provided with a neural network 161 which is means for learning. Whether or not the data supplied from the system control section 154 should be learned is decided by on-off controlling a switch 166 in accordance with the direction from the operation data input section 13.

Further, which of the learned output from the neural network 161 and the operation data itself from the operation data input section 13 should be used is decided by controlling a changeover switch located in the control parameter deciding section 165.

Thus, the learning section 16 can perform selective learning by combining the above two switches.

The facsimile device according to the above embodiment to which the present invention is applied, which has a function of learning, can greatly improve operability, image quality and transmission speed.

Although the neural network can be adopted as means for performing the learning function as mentioned above, the means such as AI (artificial intelligence) and fuzzy control may also be adopted in the present invention.

In accordance with the above embodiment of the present invention, a decision section for deciding the kind of an input image can be located within the input image processing section 151 or the system control section 154.

Some inference rules of deciding the input image have been proposed. These inference rules infer the input image on the basis of variables such as the black rate in the input image (the rate of black pixels in all pixels), the number of varying points, the amount of codes, the average number of black random numbers, the distribution of the black random numbers, and the distribution of the gradient values (difference between the maximum value and the minimum value in e.g. an area of 3×3 pixels) a local area. Specifically, these inference rules weight each variable to be expressed as a predetermined function, thereby deciding the image. The coefficients of weighting can be controlled by means of feedback from the learning section 16 to learn the preference of a user. The neural network can be applied to the inference rule and controlling or renewing the weighting coefficients.

Figure 8:
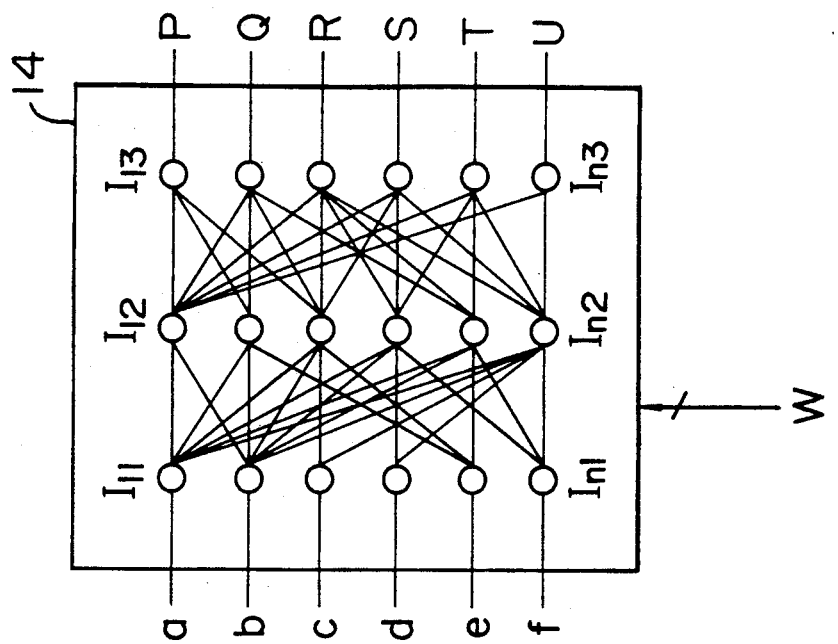
FIG. 8 is a view for explaining the decision section using a neural network.

FIG. 8 shows the arrangement of the decision section using the neural network.

In FIG. 8, inputs a to f are the above variables input from the operation data input section 13. These inputs are supplied to input layers $I_{11}$ to $I_{n1}$; the outputs from the input layers, after weighted with predetermined coefficients, are supplied to intermediate layers $I_{l2}$ to $I_{n2}$; and the outputs from the intermediate layers, after weighted with predetermined coefficients again, are supplied to output layers $I_{l3}$ to $I_{n3}$. Thereafter, the outputs P to U from the output layers, which represent decision results, are sent to the system control section 154 and displayed on the display section 18.

The user looks this display to decide if or not the above decision results agree with his requirement or preference. The decision results by the user, are supplied to the leaning section 16 from the confirmation section of the operation data input section 13. If the decision results by the user are different from the above decision results in the decision section, the learning section 16 control or renew the weighting coefficients so that the outputs from the decision section agree with the outputs from confirmation section.

Thus, the learning section 16 can learn one pattern of the user's preference.

The decision results by the decision section can be inquired at the user by tentatively outputting the decision results per one page and causing him to input his satisfaction degree. Thus, the input image processing section 151 can image-quality-process the input image in accordance with the learning results.

However, generally, the image quality can be first quantitatively evaluated by the image quality of the image at issue with that of the other image. To this end, it is preferable that the user can compare plural images with different parameters included on a page and thereafter input his satisfaction degree or preference, thereby enabling the learning to be done more efficiently.

In accordance with the embodiment of the present invention, plural images with different parameters for a part extracted from a certain image can be made, and also plural reduced images can be produced to be included on one page.

Further, the user's preference can be input by pressing a button using indices such as a number, symbol, a parameter name and a parameter value displayed or recorded with each of the output images. A preferred image of four kinds of images displayed or recorded can be input by pressing one of input buttons corresponding to the areas (upper light, lower light, ...) where the four images are located.

Further, although it has been assumed in the above explanation that the kind of a manuscript is decided in terms of the entire manuscript, it can be decided in terms of a part cut out from the entire manuscript.

The present invention, which comprises learning means unlike the conventional image zone separation or area division, can realize image quality with user's high satisfaction degree by understanding the user's preference through an interaction with the user.

Meanwhile, in order to send an image free from blur to a destination in facsimile transmission, the image quality is usually previously confirmed by copying the image on the transmission side. Then, if the image copied is not clear, the user usually reduces the binary threshold value to increase the image density. However, once the image has been transmitted, in the present facsimile the modified value of the threshold value will not be usually used.

On the other hand, in the present invention, the above operation of varying the threshold value can be monitored by the facsimile device to learn the user's preference, thereby improving the operability of the facsimile device.

Specifically, the image data of a manuscript input from the image data input section 11 in FIG. 1 are binary-digitized by the input image processing section 151 in terms of the threshold value defined on the basis of a predetermined rule by the decision section located within the input image processing section 151 or the system control section 154. The binary-digitized image data are produced as an image from the image data output section 12.

The user or operator judges the image quality of the output image and gives a preferred density level of the image from the confirmation section to the learning section 16. The learning section 16 stores changes in the input density level to modify the rule of determining the binary-digitizing threshold value in the decision section.

Although simple binary-digitizing in the prior art cannot realize the user's preference, in accordance with the present invention, the system of a quasi-half-tone display, γ conversion of density, etc. can individually deal with the user's preference thereby to improve his satisfaction degree.

Further, in the image transmission by facsimile, the user can do the communication with his high satisfaction degree using several parameters.

However, it usually takes a long time to set these parameters for the reasons why the user cannot sufficiently understand the rule of determining the parameters, etc. In most cases, the image will be transmitted in a default mode. Therefore, as the case may be, the user must answer an enquiry about an unclear portion about the transmitted image by telephone, or reset the parameters in response to a requirement of transmitting the image again.

In order to remove such convenience, many rules for automatically deciding the parameters have been proposed. However, all these rules, which do not have the means for feeding back the user's satisfaction degree, have not yet been put to practical use.

The present invention, which comprises the learning means for learning the rule of deciding the kind of a image by extracting the amount indicative of the feature of the input image, can provide communication with high satisfaction degree and good operability to a user.

The read section 115 as shown in FIGS. 2A and 2B moves from the left end of the glass 118 which is a starting point to the right end thereof to read the image on a manuscript. In this case, the read section 115 can pre-scan the image during the period of moving from the left end to the right end and actually read it during the period of returning from the right end to the left end.

Now it is assumed that the image on the manuscript mixedly includes a photograph and letters. In this case, the manuscript is first pre-scanned within the range of a γ characteristic reading level which an be easily image-zone separated, and the image can be read on the basis of the separation result. Thus, the image can be read with its high quality. Incidentally, the operation of pre-scanning is considered to be a kind of learning.

Figure 9A:
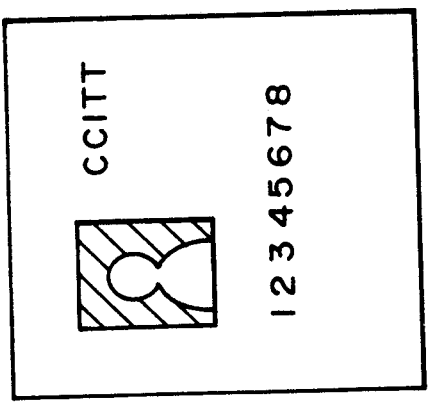
FIGS. 9A and 9B are views for explaining image separation.
Figure 9B:
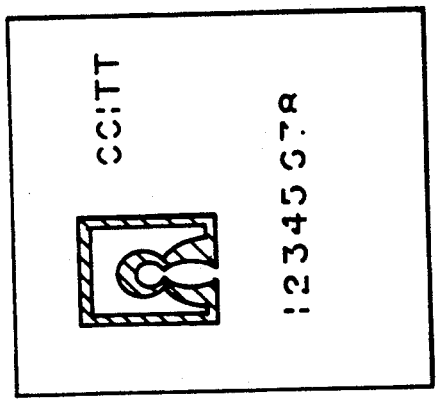

An example of the image thus separated is shown in FIG. 9B.

Figure 10:
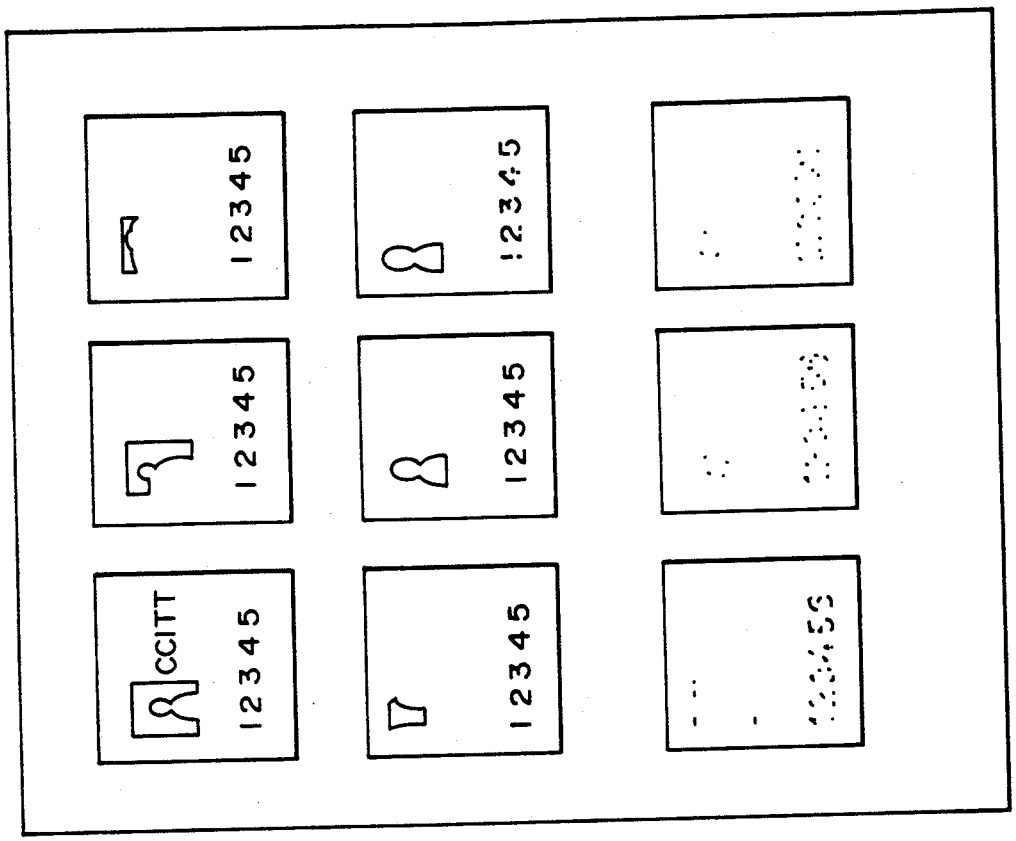
FIG. 10 is a view for explaining an example of outputs listed.

The above pre-scanning cannot necessarily separate the image to satisfy the user. Such inconvenience can be removed by causing the user to select the most satisfactory image from several clear images with different separation threshold values as shown in FIG. 10. The learning based on the selected image can further improve the accuracy of image separation. Although the example of FIG. 10 shows the images printed out on respective plural A4 size sheets of paper by a printer of the facsimile, the facsimile having an exhibition function such as a display device can display these images through interaction with the user.

Figure 11A:
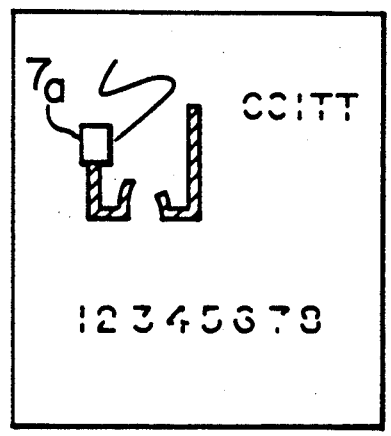
FIGS. 11A and 11B are views for explaining a modified example of the result of area division.
Figure 11B:
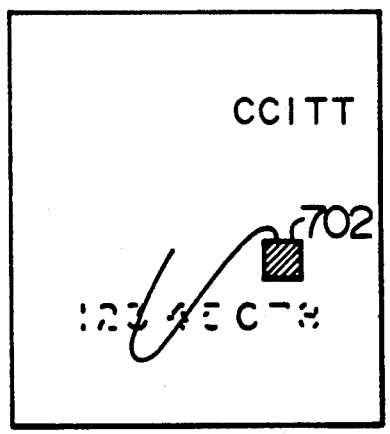

FIGS. 11A and 11B show manners of correcting the above separation results on a display screen. Specifically, FIG. 12A shows the manner of correcting a photograph part erroneously judged to be a letter part, and FIG. 12B shows the manner of correcting the letter part erroneously judged to be the photograph part. The correction operation can be performed by moving a cursor 701 (FIG. 12A) or 702 (FIG. 12B) using a keyboard or mouse. The image data after correction will be learned and used to modify the decision rule in the decision section by means of the technique of "back-propagation".

Figure 12:
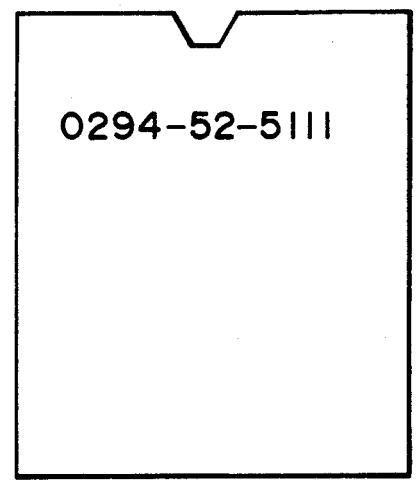
FIGS. 12 and 13 are views showing automatic dialing sheets.
Figure 13:
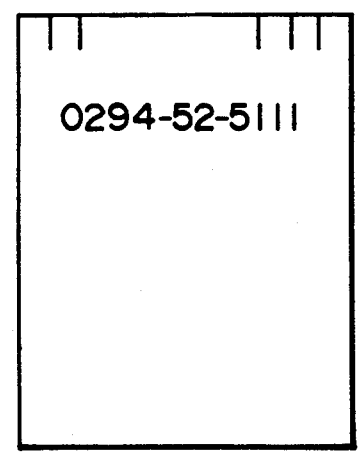

FIGS. 12 and 13 are examples of an automatic dialing sheet used in a facsimile device.

These sheets, when piled on a manuscript, cause the facsimile device to recognize the number for automatic dialing. The conventional automatic dialing sheet as shown in FIG. 12 has a notch for distinction from the manuscript at its edge. Such a sheet has disadvantages that its shape is peculiar and also its maintenance is troublesome.

In order to obviate these disadvantage of the conventional sheet, in the automatic dialing sheet according to the present invention, a specific pattern as shown in FIG. 13 is written by a user. The specific pattern is read by the facsimile device so that the leaning means can learn that this sheet is not a manuscript but an automatic dialing sheet. Thus, the user can freely prepare an automatic dialing sheet which will not be erroneously judged.

Figure 14A:
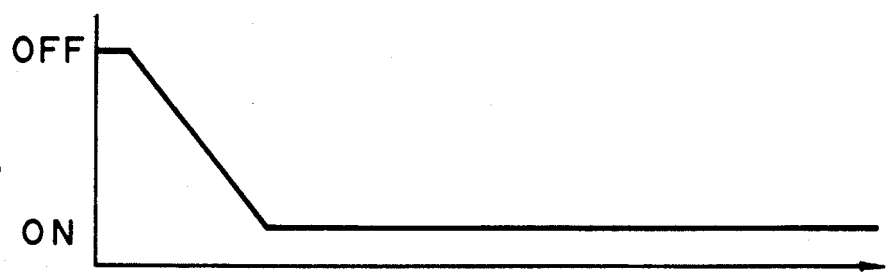
FIGS. 14A to 14C are graphs for explaining the manner of pressing an operation button.
Figure 14B:
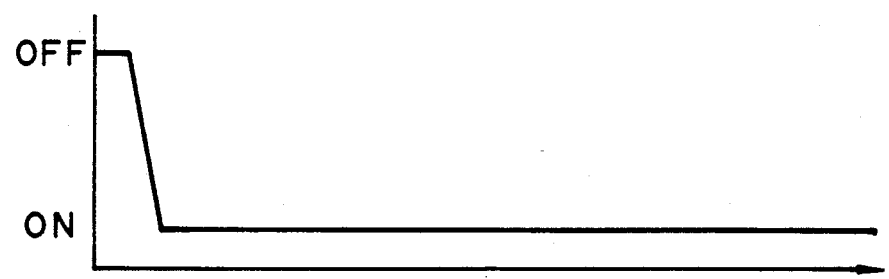
Figure 14C:
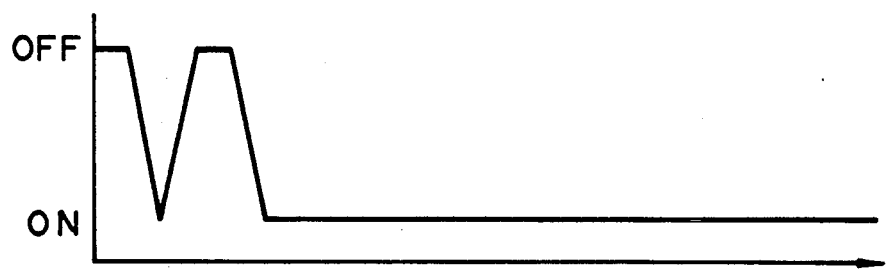

FIGS. 14A to 14C show manners of pressing a facsimile transmission button, respectively.

With the spread of facsimile devices, some devices having a few number of operation buttons have been on the market; a facsimile device having only two buttons of start and stop is even available. Under such circumstance, it is desired to notify the facsimile device of user's intention by the manner of pressing the button, thereby implementing the communication with high user's satisfaction degree.

FIGS. 14A shows the manner of softly pressing the button. This manner can define that the user attaches greater importance to image quality than transmission time (taking a long transmission time is inevitable). In accordance with the present invention, such a manner of pressing the button can be also learned. Therefore, if the user presses the button in such a manner after predetermined items are set, it is possible to cause the learning section to learn that the transmission with the image quality seriously taken should be done.

FIG. 14B shows the manner of quickly pressing the button. This manner can define that the user hopes standard transmission. FIG. 14C shows the manner of pressing twice (double clicking) the button. This manner can define that the user attaches greater importance to transmission time than image quality (poor image quality is permissible in some degree for the transmission for a short time). Thus, the user's intention can be notified to the facsimile device by causing the learning section to lean the manner of pressing a transmission button.

Generally, the facsimile device can be selectively set for one of three modes: manual receiving, automatic receiving and transfer indication. In the manual receiving mode, when the user is called by telephone, he once responds by telephone. Then, if he is being called from a partner facsimile, he presses a facsimile button to receive the facsimile. In the automatic receiving mode, when the user is called by telephone, he does not respond by telephone. Then, it is automatically detected that the telephone partner is a facsimile device thereby to receive the facsimile. In the transfer indication mode, when the user is called by telephone, this incoming is transferred to the other line or a child telephone.

If there is only one telephone line one of these three modes will be selected in the following manner. If the user or the other man is present on the place at issue, the facsimile is set for the manual receiving mode; if he is not there, it is set for the automatic receiving mode; and if he is present at the other place for his eating, it is set for the transfer indication mode.

Usually, the manner of selecting the mode depends on, in the case of an office, the day of a week, the time of a day, etc. Therefore, if the mode set at a certain time of a day of the week is previously monitored and learned in the facsimile device, the user can automatically set the desired mode without newly setting the mode; he has only to confirm the mode set. In this case, the facsimile device has only to read the time of an incorporated clock and lean the mode set.

The above automatic receiving mode includes an instant receiving mode in which immediately after an transmitted image is received, it is produced on a recording sheet; a memory receiving mode in which at a predetermined time or an indicated time after the transmitted image is received, it is produced on the recording sheet; a receiving limitation/rejection mode in which only the communication with a specific partner is permissible, etc. The facsimile device according to the present invention can learn the state of a mode setting switch to automatically select the desired mode.

In the facsimile device according to the present invention, we can learn relations between rates of being busy and the past dialing times, the rate of being busy and the time intervals to re-dialing in dialing communication partners. In this case, if an image is transmitted earlier at dinner time the facsimile device learn the effects. Moreover, time interval for redialing is important to shorten the time required to complete the broadcast communication. On the basis of such a learning result, the facsimile communication can be done more efficiently.

FIG. 15 shows the facsimile communication in the case where a facsimile device having a learning function is provided on both sides of transmission and receiving.

Who can judge the quality of an image transmitted through facsimile is basically a receiver. Therefore, in order to provide the facsimile communication with high satisfaction degree to a user, it is necessary to return or feed back the intention or judgment of the receiver to the facsimile device of the transmission side.

The present G3 Communication Protocols cannot have any feed back parameters obtained by evaluating the image quality on the receiving side to the transmission side. However, standization of the code communication in the G3 Communication Protocols is being realized. Therefore, if the standard completed is inserted as a panel in the facsimile device on the receiving side, the satisfaction degree of the receiver can be reported to he transmission side. In this case, if both facsimile devices have the function of learning as shown in FIG. 15, the facsimile device on the transmission side can learn the satisfaction degree of the receiver and store it.

Figure 16:
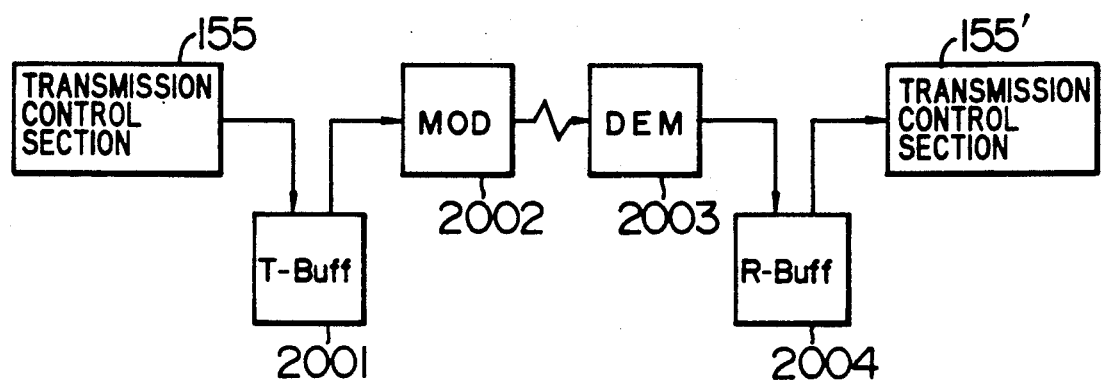
FIG. 16 is a block diagram of buffer memory control.

FIG. 16 explains an application of the learning function to controlling a buffer memory which is provided in the transmission section 17 in FIG. 1.

In FIG. 16, the image data input from the transmission control section 155 are once stored in a transmission buffer 2001 and thereafter sent out to a communication line through a modem 2002. The image data sent through the communication line to the receiving side are once stored in a receiving buffer 2004 through a modem 2003 and sent to a transmission control section 155' on the receiving side. Thereafter, the image data are decoded by a decoder (not shown) and printed out.

Now, if both facsimile devices are G3 devices manufactured by the same firm, it is intended to reduce fill characters in an MR code to enhance the transmission speed. Specifically, in encoding image data by an encoder on the transmission side, a change in the amount of buffer on the receiving side is evaluated. Then, if the evaluated amount does not exceed a predetermined threshold level, the fill characters removed.

This evaluated value, however, premises that the decoder on the receiving side completes the processing within a predetermined time. Therefore, if it takes a longer time than the predetermined time to decode the image data, the increment in the buffer amount exceeds the calculated value, thereby eventually causing the receiving buffer 2004 to overflow.

In this case, if it is possible to inform the transmission side of the fact that vacancy in the buffer amount has become on the receiving side, the transmission control can be changed by comparing the decoding capability on the receiving side with its evaluated value, and also such a circumstance can be learned on the transmission side.

Thus, by applying the learning function to controlling the buffer memory, optimum "fillless" control can be realized.

In short, the present invention comprises, on the receiving side, means for evaluating the quality of the received image and informing the evaluation result of the transmission side so that the quality of the image to be transmitted can be previously learned.

Therefore, in the communication system as shown in FIG. 15, the image according to the user's preference on not only a transmission side but also a receiving sides can be transmitted, and the image according to the mutual agreement by both users can be transmitted.

Specifically, in the conventional facsimile device, transmission parameters are determined on the basis of only the information indicated by the user on the transmission side. On the other hand, in the embodiment of the present invention, the evaluation information of the received image on the receiving side can be fed back to the transmitted to the transmission side. This means that it is possible to extract the information which a facsimile user want to transmit from the image information of the manuscript to be transmitted, and to transmit the image in the manner desired by the user, thereby providing the greatest degree of satisfaction to the facsimile user.

Figure 17:
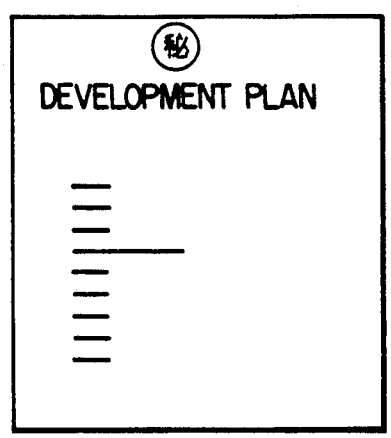
FIG. 17 is a view showing a secret document.

FIG. 17 explains to learn the feature or format of a secret document so that the image of the document can be prevented from being transmitted or a password can be required to be input.

Specifically, if a symbol representative of secret is drawn on the image of a manuscript to be transmitted, this symbol can be previously learned by the learning means according to the present invention. Therefore, when such a document is about to be transmitted, its transmission is refused. Otherwise, the use or operator is required to input the corresponding password so that whether or not the document should be transmitted can be determined by the user's response.

Figure 18A:
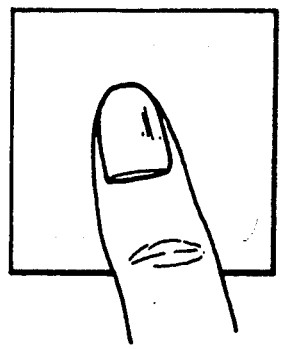
FIGS. 18A and 18B are views showing operation buttons.

FIG. 18A shows an example of the operation button of a facsimile device.

Figure 18B:
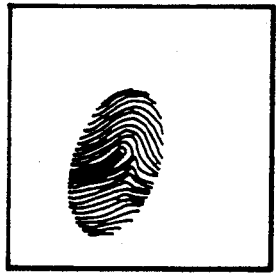

The operation button has a function of reading a fingerprint as shown in FIG. 18B. This fingerprint can be used to distinguish individuals using the learning function of the facsimile device. If the operator individual can be distinguished by reading the fingerprint or an ID card, the image of the secret document can be transmitted without requiring the operator to input the password.

The above function of reading a fingerprint can be performed by the scanner located in the image reading section 115 in the image data input section 11 as shown in FIG. 2 so that it is not necessary to particularly provide the means of reading the fingerprint.

In this case, in order to extend the reading range of the scanner not only to the glass surface on which a manuscript is placed but to the sub-scanning direction, a window for detection the fingerprint is provided. This window can be replaced by an operation indicating or starting button. When the button is pressed, the fingerprint of the finger used to press the button is read. As a result of collation of the fingerprint, the manuscript can be read, otherwise its read can be refused.

Figure 19:
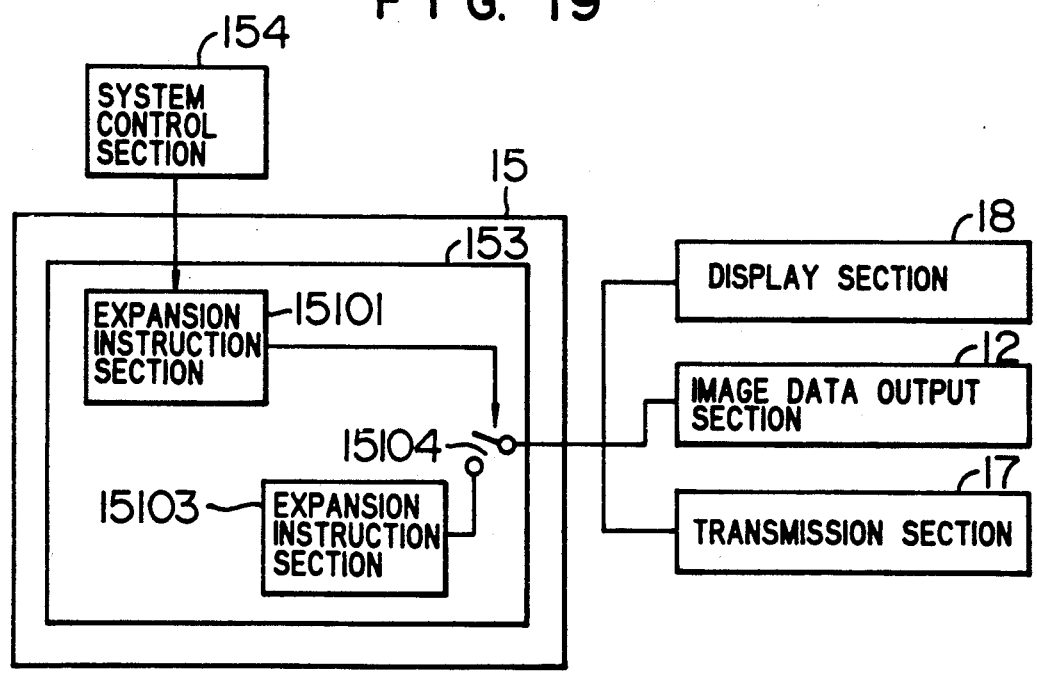
FIG. 19 is a block diagram for explaining a magnified output.

Meanwhile, it is expected that in an aging society progressing, aged men have many chances of operating a facsimile device. FIG. 19 shows a system for expanding the display data displayed on a display panel, an output recorded image, and further expanding an image to be transmitted if the receiver at a destination is an aged man, thereby improving the operability of the facsimile device.

In FIG. 19, an expansion instruction section 15101 located in the output image processing section 153 issues an instruction of expansion. Then, an expansion processing section 15103 which is also located in the output image processing section 153 will process the expansion instruction. Thus, the image data output section 12 expands the recorded image; the transmission control section 155 expands the image to be transmitted and the transmission section transmits the image thus expanded; and the display section 18 displays the image data expanded.

FIG. 20 shows the arrangement of an embodiment in which the present invention is applied to an apparatus having no communication means, e.g. a copying machine.

This embodiment removes the function of communication from the previous embodiment to which the present invention is applied to a facsimile device so that it can be used for the copying machine. This embodiment is constructed in the same design as the previous embodiment relative to the facsimile expect the communication function, and provides the same effect as the latter.

In accordance with the present invention, the image processing system, which has a function of learning, can realize the image quality, transmission speed and operability which can satisfy a user.

We claim:

1. An image processing system comprising means for learning, in accordance with user's preference, the function of each of system components which can provide a plurality of functions, and means for automatically selecting the function of the system component in accordance with the learning result.

2. An image processing system according to claim 1, wherein said learning means including a neural network.

3. An image processing system according to claim 1, further comprising means for presenting to a user the result of image processing in accordance with user's preference to inquire his satisfaction degree, and means permitting the user to confirm the result presented.

4. An image processing system according to claim 1, further comprising means for storing the learning result in an user's ID card.

5. An image processing system according to claim 1, wherein said means for learning includes means for learning the formats of secret documents, and further including means to obtain access to a secret document determined in accordance with a learning result.

6. An image processing system according to claim 1. wherein said system components include means for separating a letter zone and a photograph zone of an image to be transmitted, means for displaying the separation result for an operator, and means used by the operator to modifying the separation result displayed.

7. An image processing system according to claim 1, wherein said learning means has a plurality of the correlation values of combination of said data as initial values, and there is provided means for selecting one out of the plural initial values.

8. An image processing system comprising means for learning, in accordance with user's preference, a correlation between operation data input to the system and at least one of input/output image data, a communication state, an internal state of the system and displayed data, and means for automatically selecting a control parameter of the system component in accordance with the learning result.

9. An image processing system according to claim 8, wherein said input operation data are the number of a destination to which image data are to be transmitted, said communication state is an error rate of data in a communication line, and the control parameter is an initial value of the coefficient of an automatic equalizing filter in a transmission section.

10. An image processing system according to claim 8, wherein said control parameter is a parameter of controlling at least one of an image quality processing manner, an operation procedure, a display control manner and a communication manner.

11. An image processing system suitable for use for a facsimile comprising means for monitoring a procedure for setting parameters in image processing by a use to learn a preference of the user, and means for including a result of monitoring by said monitoring means to learning means.

12. An image processing system comprising means for feeding back an indication of readability of a receiver concerning image quality, image tone and transmission speed when image information is received by the receiver.

13. An image processing system comprising means for monitoring how an operation button is pressed, means for measuring the speed at which the operation button is pressed, means for measuring how many times the operation button is pressed for a predetermined time, means for deciding the demand of a user in accordance with at least one of the results obtained by said plural means, and means for processing an image in accordance with the user's demand thus decided.

14. An image processing system according to claim 13, wherein said image processing is to determine the line density in image transmission.

15. An image processing system comprising means for reading the present time from a clock incorporated therein, and means for reading the switch state set corresponding to the mode of manual reception, automatic reception or transfer indication for transmitted image data whereby the correlation between said time and the set states of the switches is learned.

16. An image processing system comprising means according to clam 15, wherein in response to the automatic reception, the switch state can be set for the mode of instantaneous reception, memory reception or reception refusal for the image data transmitted.

17. An image processing system comprising means for displaying or recording a plurality of images processed in terms of a plurality of parameters in such a manner that they are reduced to be included in one page, or a part of each of the images, means for display or recording each of the images supplemented with a number, a symbol, or a processing parameter, means for designating the image which a user thinks preferable, and means for learning a parameter on the basis of the designation from said designating means.

18. An image processing system according to claim 17, wherein said designating means serves to designate the image on the basis of the correlation between the displaying or recording positions of a plurality of images and the position of an input means on a display panel.

19. An image processing system suitable for use for a facsimile comprising means for determining a kind of manuscript according to a manuscript's density, digital image, or half-tone image, after reading a manuscript to be image-processed, and means for informing an operator of a kink of manuscript determined by said determining means.

* * * * *